(12) United States Patent
Slater

(10) Patent No.: US 7,519,767 B2
(45) Date of Patent: Apr. 14, 2009

(54) EMULATED TAPE-BASED STORAGE MEDIA

(75) Inventor: Alastair Michael Slater, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 223 days.

(21) Appl. No.: 11/442,128

(22) Filed: May 30, 2006

(65) Prior Publication Data
US 2007/0136518 A1 Jun. 14, 2007

(30) Foreign Application Priority Data
Oct. 31, 2005 (GB) ................. 0522227.8

(51) Int. Cl.
G06F 12/00 (2006.01)

(52) U.S. Cl. ............... 711/111; 703/23; 711/4; 711/112; 717/138

(58) Field of Classification Search ........... 711/111, 711/4, 112; 703/23; 717/138
See application file for complete search history.

(56) References Cited

U.S. PATENT DOCUMENTS

| 4,947,367 | A | 8/1990 | Chang et al. | |
| 5,455,926 | A | 10/1995 | Keele et al. | |
| 6,049,848 | A | 4/2000 | Yates et al. | |
| 6,490,648 | B1 | 12/2002 | Kaneda et al. | |
| 2003/0188251 | A1* | 10/2003 | Brown et al. | 714/763 |
| 2004/0098244 | A1* | 5/2004 | Dailey et al. | 703/24 |
| 2004/0268017 | A1* | 12/2004 | Uzrad-Nali et al. | 711/1 |
| 2005/0193235 | A1 | 9/2005 | Sandorfi et al. | |
| 2006/0047905 | A1 | 3/2006 | Matze et al. | |

FOREIGN PATENT DOCUMENTS

WO 2005/017686 A2 2/2005
WO 2005/033945 A1 4/2005

* cited by examiner

Primary Examiner—Stephen C Elmore
Assistant Examiner—Jae U Yu

(57) ABSTRACT

A system, method and a computer program product for emulating a tape-based storage system to provide data storage. The system includes a data storage medium storing a data set which represents the data layout of the emulated tape-based medium, and an interface for providing access to a non-tape-based data storage medium, using tape-based media commands and using the data set. The fist data set includes filemark location data and block number data for mapping between filemark locations and block numbers of the emulated tape-based storage medium and the non-tape-based data storage medium.

6 Claims, 9 Drawing Sheets

| F_POS | BLOCK_NO | SIZE_CHANGE |
|---|---|---|
| 0 | - | 32768 (32K) |
| 32768 | 1 | - |
| 32769 | - | - |
|  |  |  |
|  |  |  |

*Fig. 4*

EMULATED TAPE-BASED STORAGE MEDIA

RELATED APPLICATIONS

The present application is based on, and claims priority from, Great Britain Application Number 0522227.8, filed Oct. 31, 2005, the disclosure of which is hereby incorporated by reference herein in its entirety.

1. Field of the Invention

This invention relates to data storage, and more particularly to emulated tape-based media and a system, method and a computer program product for emulating a tape-based storage system to provide data storage.

2. Related Art

Non-volatile data storage devices are characterized by the fact that data will remain stored when power is removed from the device. Recording of data for such devices can be performed mechanically, magnetically, or optically.

A typical way to classify this type of data storage media is to consider the shape and type of movement (or non-movement) relative to the read/write device(s) of the storage apparatus. Thus, data storage mechanisms for storage media may be separated into three main categories: memory card storage (solid state semiconductor memory); disk storage (flat, round, circularly-spinning object); and tape storage (long, thin, flexible, linearly moving bands).

In disk storage devices, data is transferred to planar surfaces or disks for temporary or permanent storage. The random-access, low-density storage of disks has historically been complemented by the sequential-access high density storage provided by magnetic tape.

Tape-based storage devices are typically used for archival storage of data stored on hard drives and for reading and writing data stored on a magnetic tape. Tape drives are sequential-access, and must wind past all preceding data to read any one particular piece of data. They are not the fastest form of data storage, as they are sequential, but are long lasting and cost efficient. Tape drives can be connected with different types of interface, for example SCSI (most common), parallel port, IDE, USB, Fibre Channel or Firewire interfaces.

Data is written to tapes in blocks with inter-block gaps between them. Each block is typically written in a single operation with the tape running continuously during the write. In contrast to magnetic disks, finding a certain block on the tape involves reading sequentially from the beginning. Tape devices are therefore not normally suitable for random access. However, the exception to this is that some systems allow tape marks to be written which can be detected while winding the tape forward or rewinding it at high speed. These are typically used to separate logical files or backup sessions on a tape.

Innovation in disk storage technology has reduced the density and cost per bit gap between disk and tape, reducing the importance of tape devices as a complement to disks. Furthermore, the performance of a tape device cannot be guaranteed if the tape is dropped or is exposed to non-ideal environmental conditions. Thus, tape device manageability is suboptimal for a number of cases, particularly where human intervention is needed for media management.

Although disk storage technology is now the preferred choice for storing data, there still exist legacy data storage applications that require the use of sequential-access tape devices. It is also desirable to be able to make use of previous investment in software skills and management processes for backup and restore activities within an organization.

It is therefore desirable to realize the functionality of tape-based storage within a disk-based storage system. The idea of emulation of a tape storage system has been disclosed in WO 2005/017686 and WO 2005/033945.

SUMMARY OF THE INVENTION

According to an aspect of the invention, there is provided a system for emulating a tape-based storage medium, comprising:

a data storage medium storing a data set which represents the data layout of the emulated tape-based medium; and an interface for providing access to a non-tape-based data storage medium, using tape-based media commands and using the data set, wherein the data set comprises filemark location data and block number data for mapping between filemark locations and block numbers of the emulated tape-based storage medium and the non-tape-based data storage medium.

According to another aspect of the invention, there is provided a method of accessing data on a non-tape-based physical data storage medium, using tape-based media commands, the method comprising:

receiving tape-based media commands using filemark location data and block number data;

interfacing with the non-tape-based data storage medium using said tape-based media commands by mapping from the filemark locations and block numbers to the non-tape-based physical data storage medium, thereby emulating a tape-based storage medium.

The invention also provides a computer program product comprising computer program code for implementing the method of the invention.

BRIEF DESCRIPTION OF THE DRAWINGS

For a better understanding of the invention, embodiments will now be described, purely by way of example, with reference to the accompanying drawings, in which:

FIG. 4 illustrates an example of a data structure within the file system layer 320 of FIG. 3;

DETAILED DESCRIPTION OF THE INVENTION

Figure 1:
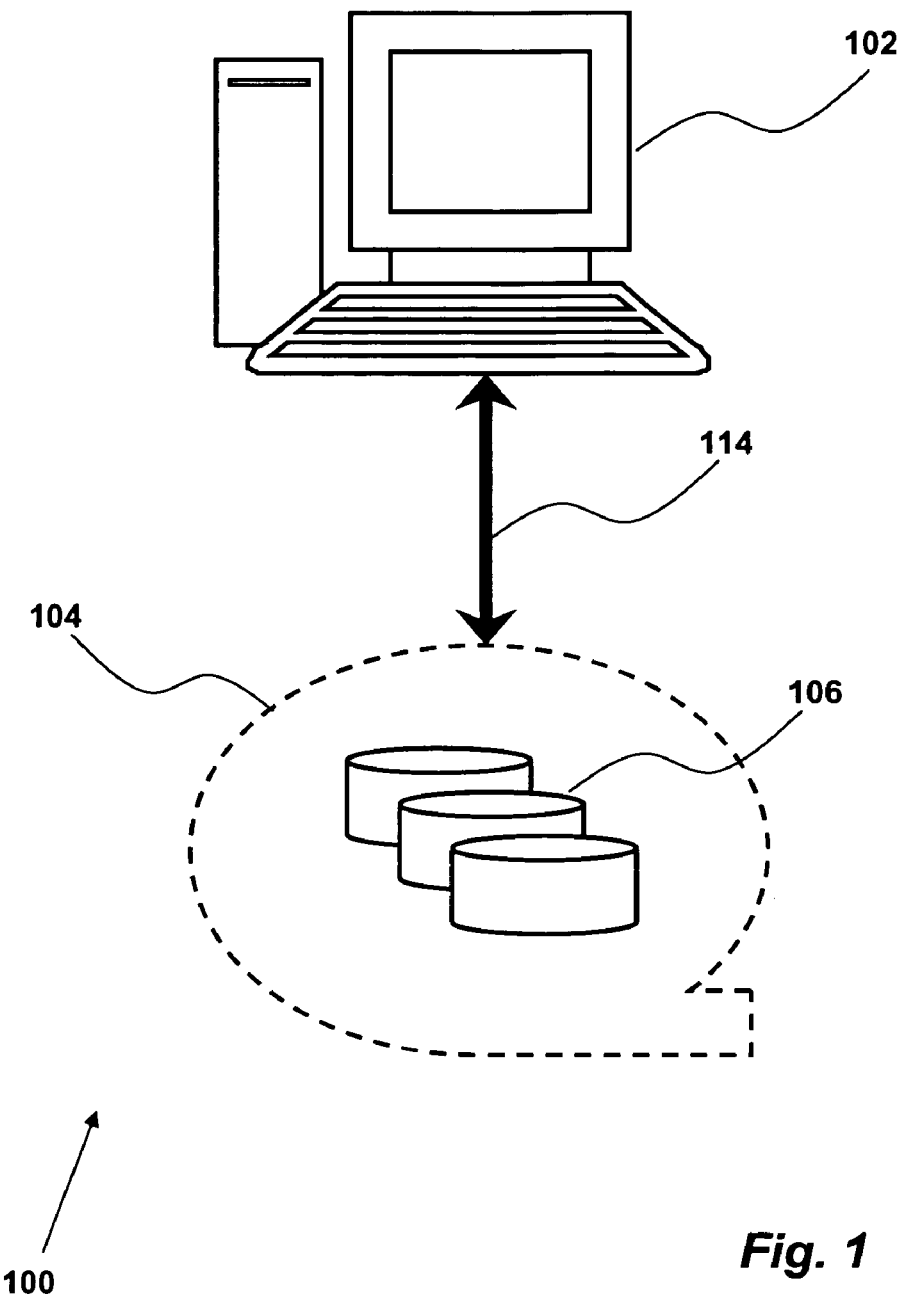
FIG. 1 shows a storage system according to an embodiment of the invention is illustrated.

While the present invention is susceptible of embodiment in various forms, there are described and shown in the drawings presently preferred embodiments. These embodiments are provided so that this disclosure will be thorough and complete, and will fully convey the scope of the invention to those skilled in the art. Like reference numerals refer to like elements throughout.

Referring to FIG. 1, a storage system according to an embodiment of the invention is illustrated. The storage system 100 comprises a computer 102 interfaced, via a connection 114, to hardware/software that emulates tape-based media 104 using disk-based media 106. The hardware/software is arranged to emulate the tape-based media 104 such that a back-up/restore application running on the host computer 102 sees, via the interface connection 114, the same view of the disk-based media 106 as with tape-based storage media. The hardware/software is also arranged to translate linear, sequential, tape format data into data that is suitable for storage on the disk-based media 106.

The computer 102 may take the form of a single chip controller, and the disc storage utilized may not be local to the controller, for example provided over a network.

The disk-based storage media 106 may be, for example, one or more disk arrays. The disk-based storage media 106 provide the actual storage space for backed-up data from the host computer 102. In a preferred embodiment, the disk-based storage media 106 includes a plurality of disks. Such disks are Commercial-Off-The-Shelf (COTS) products and may be relatively inexpensive compared to conventional storage array products.

Thus, the storage system 100 may include emulated tape-based storage media 104 such as tapes. These "emulated media" 104 are presented to the host computer by the storage system hardware/software such that, from the point of view of the host computer 102, data appears to be backed-up onto tape-based media, but is in fact backed-up onto the disk-based storage media 106.

Figure 2:
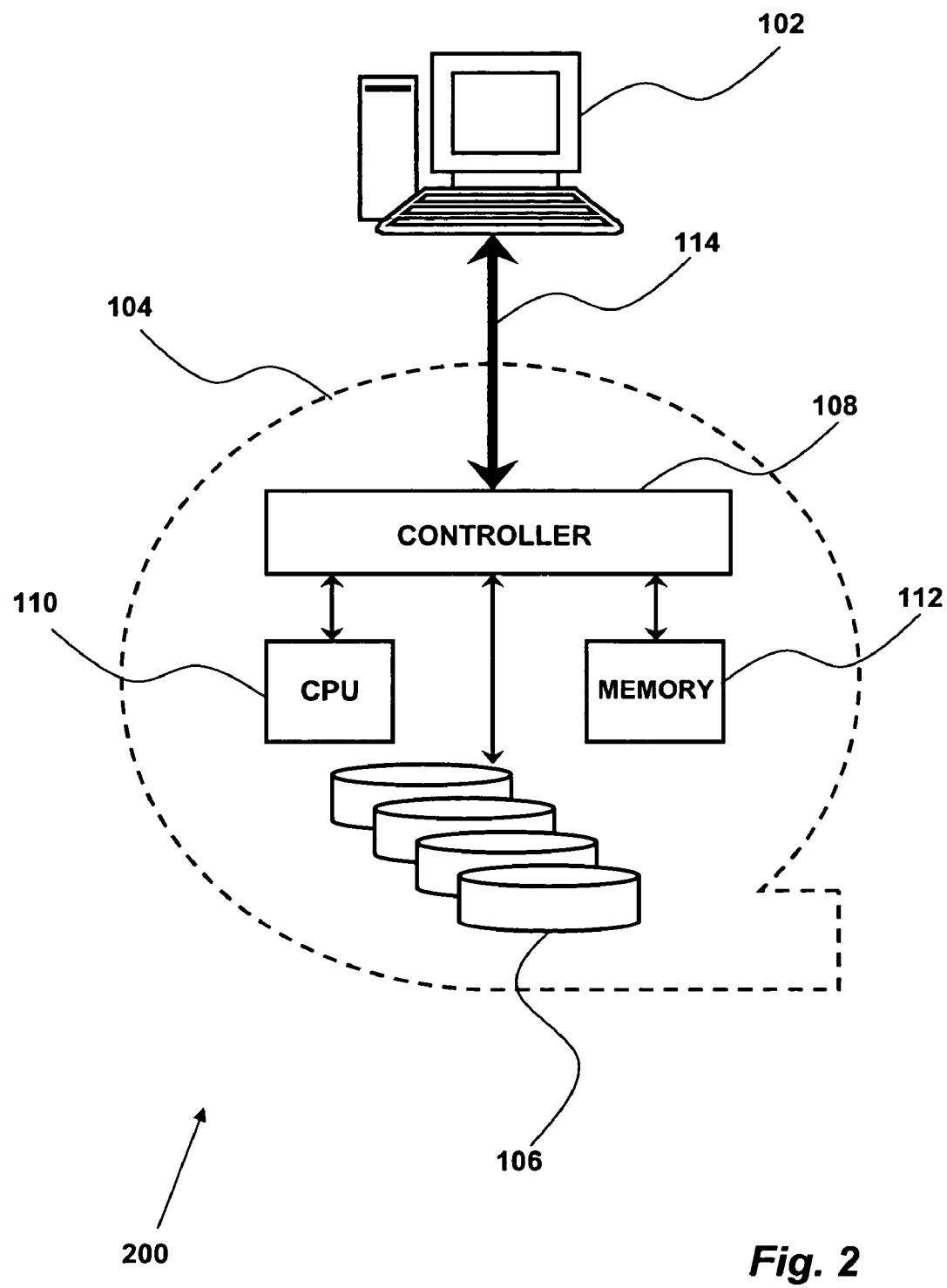
FIG. 2 is a block diagram of a storage system according to an embodiment of the invention.

Referring to FIG. 2, there is illustrated a block diagram of a storage system 200 according to an embodiment of the invention. The storage system 100 includes a storage controller 108 that is connected to the disk-based storage media 106. The storage system controller 108 is also connected to a processor 110 and a memory 112 (such as RAM, ROM, PROM, EEPROM, Flash memory, etc.) which, together, may run all or part of the storage system software. As discussed above, the host computer 102 may then back-up data onto the disk-based storage media 106 via an interface 114 that couples the host computer 102 to the storage controller 108.

Software, including programming code that implements embodiments of the present invention, is typically stored on a computer readable and/or writeable recording medium, and then copied into memory 112 wherein it may be executed by the storage controller 108 and processor 110. Such programming code may be written in any of a plurality of programming languages, for example, Java, Visual Basic, C++, Pascal, or combinations thereof, as the present invention is not limited to a particular programming language.

It is to be appreciated that although the software may be described as being "included" in the storage system 100, and may be executed by the processor 110 or the storage system controller 108, there is no requirement that all the software is executed on either the storage system controller 122 or the processor 108. The software may be on a host computer elsewhere that has access to the same set of disks that are used.

A conventional tape library back-up system can thus be provided using disk arrays to replace tape cartridges as the physical back-up storage media. Physical tape-based media that would be present in a conventional tape library are replaced by what is termed herein as "virtual tapes." For the purposes of this disclosure, the term "virtual tape library" refers to an emulated tape-based library. Such a virtual tape library may be implemented in software and/or physical hardware using one or more disk array(s).

The following discussion will now explain various aspects, features and the operation of the software included in the storage system 100. As discussed above, the flow of data between the host computer 102 and the emulated tape-based media 104 may be controlled by a back-up/restore application.

Figure 3:
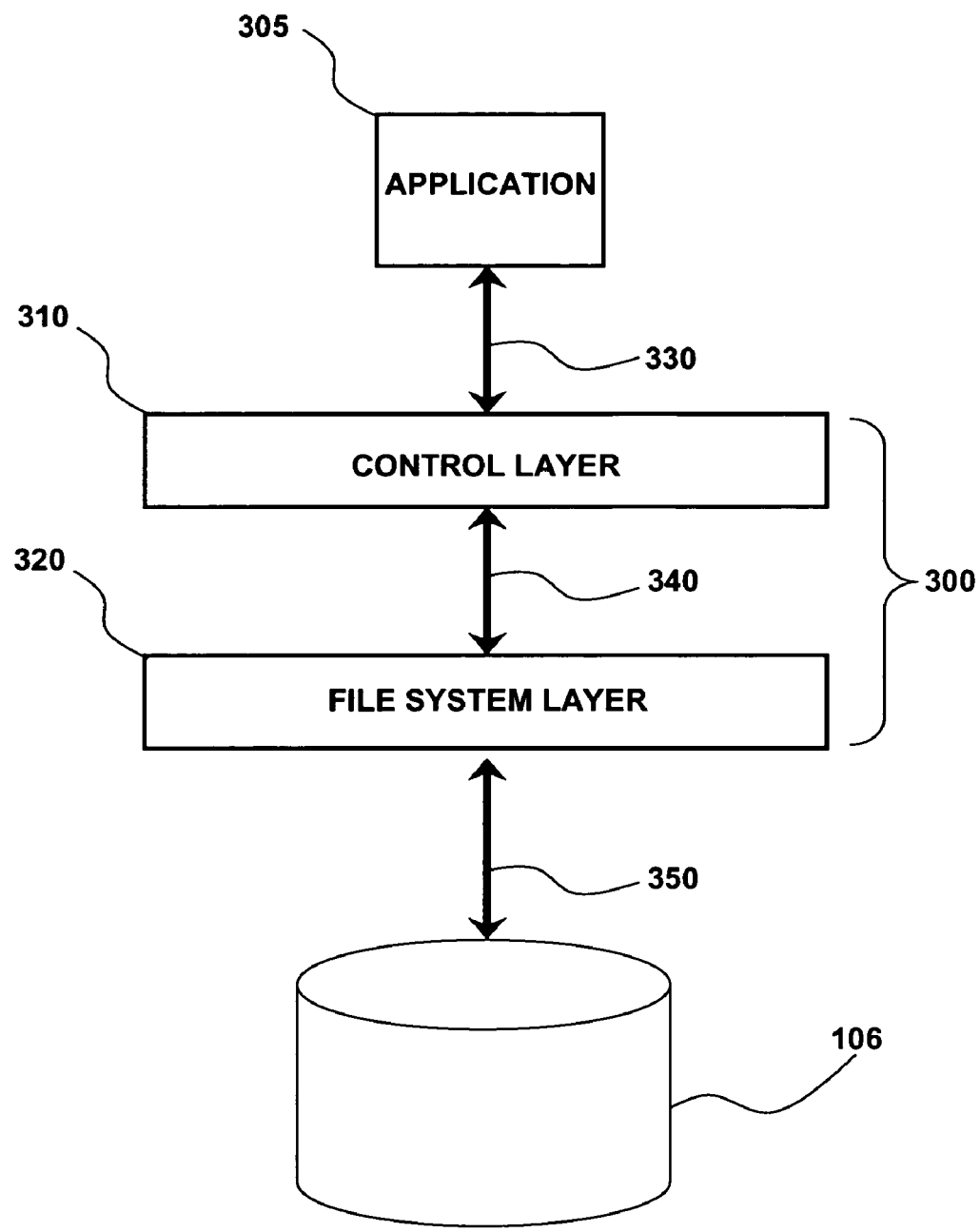
FIG. 3 is a block diagram illustrating the virtual levels of the storage system shown in FIG. 2.

Referring to FIG. 3, a block diagram is shown that illustrates the virtual levels of the storage system shown in FIG. 2. The storage system software, indicated generally by 300, includes logical abstraction layers that represent the emulated tape-based storage media and provide an interface between a back-up/restore application 305 on the computer 102 and the disk-based storage media 106.

The software 300 comprises a first layer 310, referred to hereinafter as the control layer 310, and a second layer 320, referred to hereinafter as the file system layer 320.

The control layer 310 provides a SCSI emulation of tape-based media. The backup/restore application 305 may communicate with the control layer 310 (e.g., to back-up or write data to the emulated tape) using, for example, SCSI commands represented by arrow 330. The control layer 310 therefore provides a software interface between the back-up/restore application 305 and the remaining storage system hardware/software. The emulated tape-based media (represented in the control layer 310) is thereby presented to the back-up applications as conventional tape-based storage media.

The file system layer 320 provides an interface between the emulated tape-based media and the physical disk-based storage media 106. The file system layer 320 provides for communication with the control layer as shown by arrow 340, and with disk-based storage media 106 using, for example, SCSI commands, represented by arrow 350, to read and write data to and from the disk-based storage media 106.

FIG. 4 illustrates a data structure within the file system layer 320 of FIG. 3. The file system layer 320 comprises a table data structure 400 including first to third columns 410, 420, 430 for storing information.

The data in the table is used to map between tape-based commands and the disk-based memory device (which may be a different type of non-tape-based medium). The table stores data which is required by the tape-based commands in an efficient manner, to enable conversion to data locations and commands for the control of the disk-based storage medium.

A first column 410 stores entity locations in the form of byte offset values (F_POS), the entity locations defining where a filemark has been written, in byte offset from a reference position. The data in this column indicates the location of a change in data block size, and the location of the end of data. As will be apparent from the description below, the data in the other columns determines the type of information the filemark is encoding.

A second column 420 stores the tape block numbers (BLOCK_NO) that the respective filemarks correspond to. Thus, when a block number is present, the filemark location indicates the end location for that block of data.

A third column 430 stores the I/O size change (SIZE_CHANGE) of every change that occurs. When size change data is present, the filemark location indicates the location of that block size change.

Within tape-based storage media, data blocks may be of varying size, depending on the storage mode of the storage system. When in fixed mode, a data block is typically 1024 bytes in size (although it may be fixed at any other suitable size). However, when in variable mode, a data block may be of any suitable size, and is usually dependent on the amount of data to be stored or a value chosen to optimise the speed of the backup process, for example the size of the data file, or a device optimal value.

The data structure 400 of the file system layer 320 includes filemark locations because filemarks are used by conventional tape-based storage media and are written along with data files. Consequently, back-up/restore applications 305 expect to see filemarks when viewing emulated tape-based storage media 104. The filemarks are therefore recorded in the data structure 400.

To enable a better understanding of the data structure 400, and how it is used, a specific example of the data structure 400 and its contents will now be described with reference to FIG. 4.

A first row 440 of the data structure 400 indicates an IO size change occurrence. The current byte offset being written at, hereinafter referred to as F_POS, when the size change occurs is indicated as zero (0) in the first column 410 of the first row 440. The second column 420 of the first row is left empty since the size change occurrence does not correspond to a block number, as it is not encoding the end position of a block. The third column 430 of the first row 440 contains the size change value of 32768 bytes (32K), thus indicating the change of a block size to 32768 bytes (32K). It should be appreciated that file data may be stored in a block size other than 32768 bytes.

A second row 450 of the data structure 400 indicates an updated filemark position after data has been written to the storage media 106. The first column 410 of the second row 450 indicates the updated F_POS as 32768 bytes (namely one block further on) and the second column 420 of the second row 450 correspondingly indicates that 1 block of data was written; the value BLOCK_NO being incremented by one when one variable mode write or filemark is written. Because there was no size change occurrence, the third column 430 of the second row 450 is left empty.

The first column 410 of a third row 460 of the data structure indicates an updated filemark position as 32769 bytes, F_POS being incremented by one as the filemark is written. The remaining columns of the third row 460 are empty. Because there is neither an IO size change nor a block number indicated in the third row 460, the end of the data is implicitly indicated at the offset position of 32769 bytes.

It may be appreciated that the contents of a row in the data structure 400, or more precisely the lack of specific contents of a row, implicitly indicate the type of IO action. Thus, there is no need to store additional data providing the absolute End of Data (EoD) location. This information can be extracted from the contents of the data rows and columns of the data structure 400.

However, to reduce any computational requirements associated with having to extract such implicit information, alternative embodiments of the invention may store such information separately. For example, the data structure may comprise a further column arranged to store the IO action-type that occurs, or the EoD position may be stored as a separate entity that is updated over time as valid write requests occur. Applications may issue a specific "space to end of data" command.

The file system layer 320 therefore comprises a data structure 400 that is arranged to store information relating to IO communications received from the control layer 310. This information may then be used to validate and map commands to the disk-based storage media 106, thus enabling an interface between the emulated tape-based media 104 (represented in the control layer 310) and the physical disk-based storage media 106. The file system 320 therefore allows the control layer 310 to have random (as opposed to sequential) access to any data file stored on the disk-based storage media 106.

By recording the size change occurrences, read requests can be checked for validity against the structure of the data of the emulated tape-based medium. For example, it can be verified whether or not a read request specifies a number of blocks that crosses an entity size change boundary, and thus appropriate error conditions (for example illegal length indicators) can be flagged if desired.

Thus, it should be appreciated that the file system layer 320 may be provided with either a singular file or multiple files for representation of a tape/cartridge entity. However, it is envisaged that a singular file representation, such as an XML schema, may provide inadequate data storage relative to the amount of metadata being stored. The suggested table described above provides a trade-off against such pace usage, being able to grow over time as necessary.

Examples of the methods undertaken by the control layer 310 in order to enable emulation of tape-based media will now be described in more detail. A first method enables the initialisation of the emulated tape-based media 104 so that it may be used by a backup/restore application 305. A second method provides for the processing of incoming SCSI commands from a backup/restore application 305.

Figure 5:
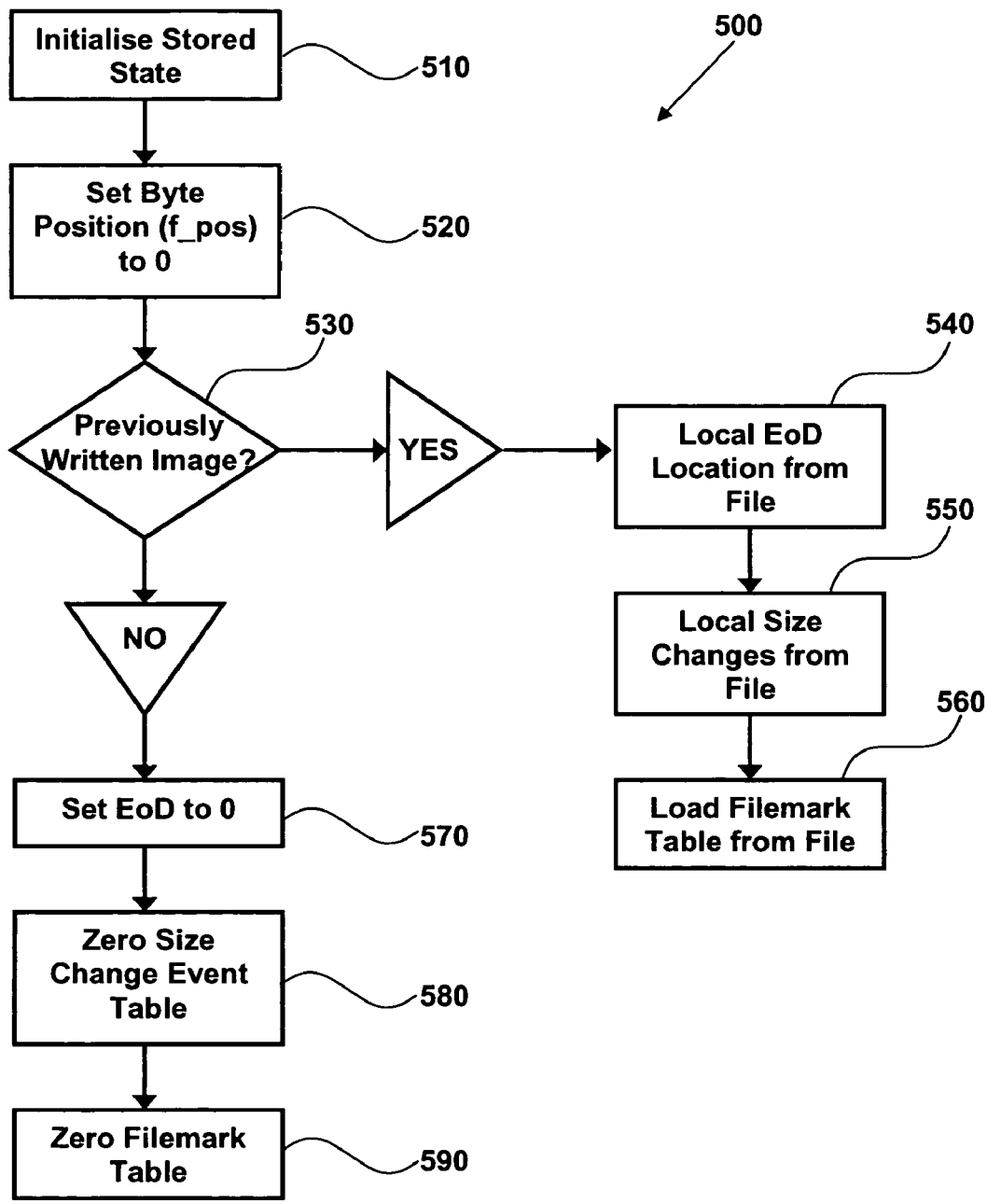
FIG. 5 is a flow diagram of a method of initialising the storage system shown in FIG. 2.

A method of initialising the storage system of FIG. 2 will now be described with reference to the flow diagram of FIG. 5. The steps of the method are indicated generally by 500.

In the first step 510 the command to initialise the system with a new or empty virtual tape cartridge is received and recognised. Upon recognition of a initialise command, the new or empty virtual tape is prepared for initialisation and the method continues to the next step 520.

In step 520, the current logical byte position F_POS is set to zero (0) so that the filemark refers to the starting location of the emulated media.

In step 530 it is determined whether the emulated media is to be continued from a previously written image of tape-based media. If a previously written image for continuation exists, the method proceeds to step 540 so that the information relating to the previously written image can be loaded into the appropriate virtual cartridge state tables. If there is no previously written image, the method proceeds to step 570.

As mentioned above, completion of step 540 and its subsequent steps loads information relating to a previously written tape image into the state tables of the file system layer. In step 540 the End of Data (EoD) position for the previously written tape image is extracted from the data relating to the existing tape image and stored in the state tables relating to the new virtual media. Information relating to the history of size changes for the existing tape image is then extracted and stored in the virtual cartridge state tables in step 550. Finally, in step 560, information relating to the history of filemark positions for the previously written image is extracted and stored in the appropriate state tables. These steps provide a starting point for the loading of new data, without losing existing data.

If there is no previous data to be loaded into the state tables, completion of step 570 and its subsequent steps initialises the state tables for the new emulated media by 'zeroing' the relevant data in the state tables.

In step 570, the End of Data (EoD) position for the new tape image is set to zero (0), indicating that there is no data to be read or that can be read The size change history in the state tables for the new image is set to empty, or 'zeroed', in step 580 and, in step 590, the history of filemark positions and the current byte offset (F_POS) in the state tables for the new image is zeroed.

Thus, there has been described a method of initialising an emulated storage system. The method caters for the initialisation of new emulated media from existing tape images, in addition to the initialisation of completely new instances of emulated tape-based media.

Figure 6:
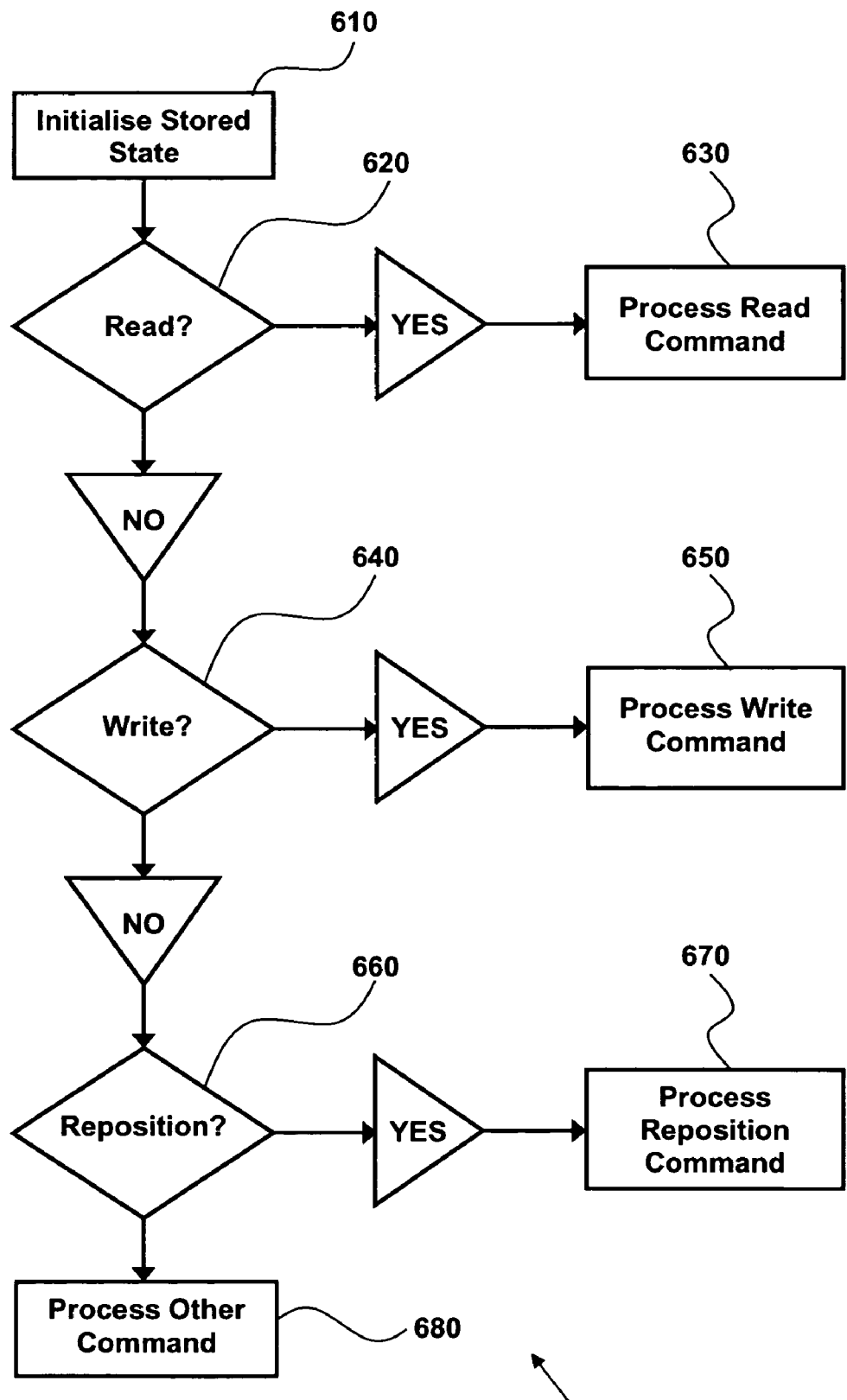
FIG. 6 is a flow diagram of a method of processing commands for the storage system shown in FIG. 2.

A method of processing SCSI commands for the storage system of FIG. 2 will now be explained with reference to FIG. 6, wherein the steps of the method are indicated generally by 600.

In the first step 610 a SCSI command for the emulated tape-based media is received. Upon reception of a SCSI command the method continues to the next step 620.

In step 620, it is determined whether or not the SCSI command is a read command. If the SCSI command is determined to be a read command, the method continues to step 630 within which the read command is processed in order to retrieve the requested data from the emulated tape-based media, the data to be read being stored on the physical disk-based storage media 106. When processing a read request, a number of checks are undertaken to ensure that the read request is valid. The checks include ensuring that the size of the requested data is valid (according to the size change list stored in the data structure 400), and that there are enough blocks to satisfy the request (for example, that the read request does not cross entity boundaries such as filemarks or the end of data entity "EoD"). In the event of the request being invalid, appropriate amounts of data are transferred and the associated residue of the unfulfilled request is reported.

If the SCSI command is not determined to be a read command in step 620, the method continues to step 640 wherein it is determined whether or not the SCSI command is a write command.

If the SCSI command is determined to be a write command in step 640, the method continues to step 650. In step 650, the write command is processed so that the required data is written to the emulated tape-based media, the data being written to the physical disk-based storage media 106. Alternatively, if the SCSI command is not determined to be a write command in step 640, the method continues to step 660.

In step 660, it is determined whether or not the SCSI command is a space command, which may also be considered to be a reposition command. If the SCSI command is determined to be a space command, the method continues to step 670. In step 670, the reposition/space command is processed using the data contained in the data structure 400 of the file system layer 320 to synchronise the virtual tape position with the request, either in forwards or backwards direction from the current position of the emulated tape-based media 104. Alternatively, if the SCSI command is not determined to be a reposition/space command in step 660, the method continues to step 680.

In step 680, it is known that the SCSI command is not a read, write, or reposition/space command. Consequently, in step 680, the nature of the SCSI command is determined according to a remaining set of possible commands.

Figure 7:
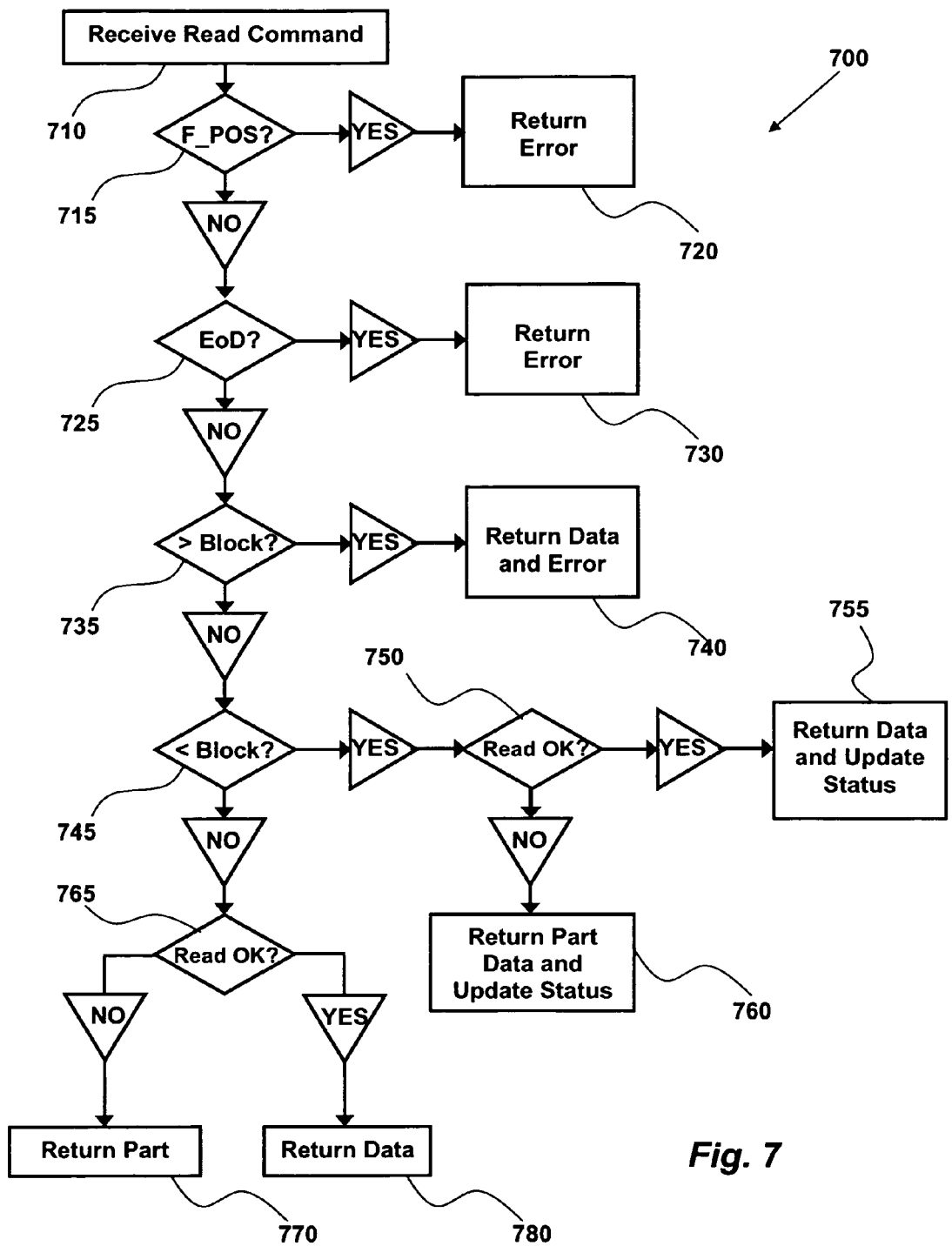
FIG. 7 is a flow diagram of a method of processing a read command for the storage system shown in FIG. 2.

For greater understanding of the above method for processing SCSI commands for emulated of tape-based media, an example of a method of processing a read command will now be described with reference to FIG. 7, wherein the steps of the method are indicated generally by 700.

In the first step 710, a read command is received and its corresponding attributes are extracted. Typically, the attributes associated with a read command for tape-based media relate to the mode (fixed or variable) and the length/size of the read request.

In step 715, an internal state check is undertaken to determine whether the current position of the emulated tape-based media 104 is at a filemark position. If it is determined to be at a filemark position, the occurrence of a corresponding read error (at Filemark) is returned by the control layer 310 and communicated to the backup/restore application 305 in step 720. Otherwise, the method continues to step 725 wherein a second internal state check is undertaken to determine whether or not the current position corresponds to the EoD.

If, in step 725, the location is determined to correspond to EoD, the occurrence of a corresponding read error (at EoD) is returned by the control layer 310 and communicated to the backup/restore application 305 in step 730. Otherwise, the method continues to step 735 wherein it is determined whether or not the length of data to be read is shorter than the current blocksize, as determined from the data 400.

If, in step 735, it is determined that the amount of data to be read is shorter than the current blocksize, the method continues to step 740. Otherwise, the method continues to step 745. In step 740, the requested data to be read is returned from the corresponding location of the physical disk-based storage media 106 and communicated to the backup/restore application via the control layer 310. However, because the read request was shorter than the corresponding blocksize, the occurrence of a corresponding read error ("illegal length indicator—short") is also returned by the control layer 310 and communicated to the backup/restore application 305 in step 740.

In step 745, it is determined whether or not the data to be read is longer than the current blocksize. If the data to be read is determined to be longer than the blocksize value, it is then determined, in step 750, whether or not the read operation may be performed without reading through/past a filemark position to another data entity. If, in step 750, it is determined that all of the requested data can be read without crossing a filemark, the requested data is returned from the corresponding location of the physical disk-based storage media 106 in step 755. In step 755, the values of F_POS and block number in the state tables are also updated according to the number of data bytes that were read from the storage media 106. F-POS is incremented by the number of bytes transferred, and the block number either increments by one (if in variable mode) or by the correct number of fixed blocks (if in fixed mode). If it is determined that all of the requested data cannot be read without crossing a filemark location (step 750), the part of the requested data before the next entity is returned from the corresponding location of the physical disk-based storage media 106 in step 760. Also in step 760, the occurrence of a corresponding read error ("illegal length indicator—long") is returned by the control layer 310 and communicated to the backup/restore application 305 and the values of F_POS and block number in the state tables are updated to be just before the next data entity.

Referring back to step 745, if it is determined that the data to be read is not longer than the current blocksize, it is still determined, in step 765, whether or not read operation may be performed without reading through/past a filemark position to another data entity. Similarly to above, if it is determined that all of the requested data cannot be read without crossing a filemark (step 765), the part of the requested data before the next entity is returned from the corresponding location of the physical disk-based storage media 106 in step 770. However, in step 770, the occurrence of a different corresponding read error (Read_EoD or Read_Filemark) to that of step 760

(ILI_Long) can be returned by the control layer 310 and communicated to the backup/restore application 305. Of course, the same error message (ILI_Long) could be used. Also, in step 770, the values of F_POS and block number in the state tables are updated to be just before the next data entity.

If, in step 765, it is determined that all of the requested data can be read without crossing a filemark or EoD location, all of the correctly requested data is returned from the corresponding location of the physical disk-based storage media 106 in step 775. The status that the read command was correct and completed successfully is also indicated by the control layer 310 in step 775, and the values of F_POS and current block number position within the emulated tape cartridge are updated according to the number bytes transferred/read from storage media 106.

It will be appreciated that some of the above steps may be undertaken in a different order to that as described above. For example, the step (725) of determining whether or not the current tape position is at the EoD may be undertaken prior to the step (715) of determining whether current tape position is at a filemark position.

Figure 8:
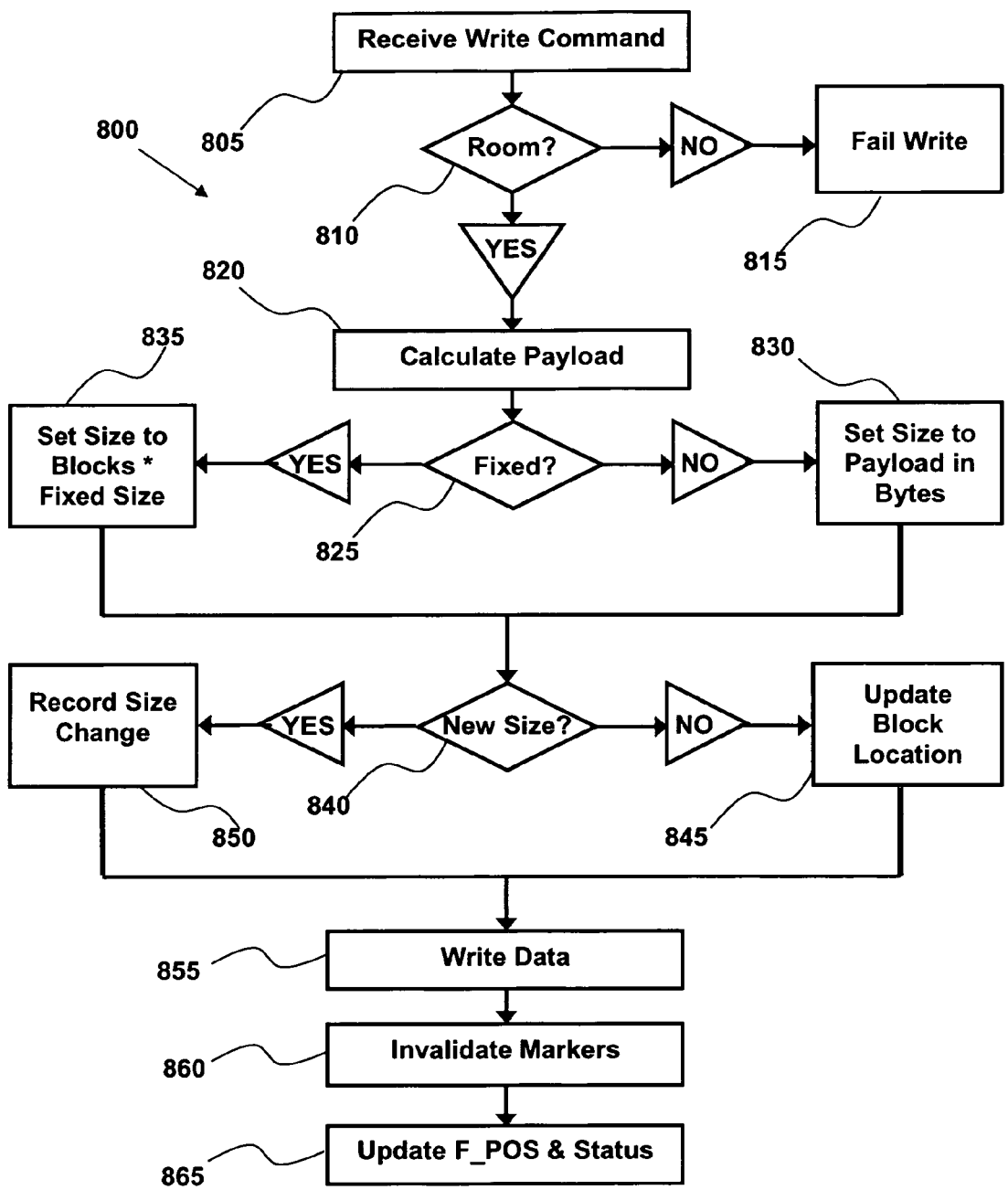
FIG. 8 is a flow diagram of a method of processing a write command for the storage system shown in FIG. 2.

An example of a method of processing a write command will now be described with reference to FIG. 8, wherein the steps of the method are indicated generally by 800.

In the first step 805, a write command is received and its corresponding attributes are extracted. Typically, the attributes associated with a write command for tape-based media relate to the mode (fixed or variable) and the length/size of the write request.

In step 810, it is determined whether there is enough space available on the emulated tape-based media, which in turn is the available space on the associated section of the physical disk-based storage media 106. If it is determined that there is not enough available space for the requested data to be written, the occurrence of a corresponding write error (at EoT or Fail_Write) is returned by the control layer 310 and communicated to the backup/restore application 305 in step 815. Otherwise, the method continues to step 820 wherein the payload (in bytes and blocks) of the data to be written is determined. After determining the transfer payload (step 820), the method continues to step 825.

In step 825, it is determined whether or not the write request mode is in fixed mode. If it is not in fixed mode, a value for the transfer size of the write command is set to the determined value of the payload in bytes in step 830. Otherwise, the method continues to step 835 wherein a value for the transfer size of the write command is set to the previously determined value of the payload in blocks multiplied by the fixed blocksize value.

Upon completion of either of steps 830 or 835, the method continues to step 840. In step 840, it is determined if the blocksize of the write request is different to the last blocksize value stored in the system.

If, in step 840, it is determined that the blocksize is not different, the current value for the block location (BLOCK_NO) in the state tables is incremented in step 845. The specific incremental value depends on the mode type determined in step 825. If the mode was determined to be fixed mode, the value of BLOCK_NO is incremented by the number of blocks in the payload, otherwise the value of BLOCK_NO is simply incremented by one (because the payload is only one block of the predetermined payload size in bytes).

If, in step 840, it is determined that the blocksize is different to the last IO stored in the state tables, the method continues to step 850. In step 850, a size change event is recorded in the state tables, with the appropriate values of the F_POS and SIZE_CHANGE being stored.

Upon completion of either of steps 845 or 850, the method continues to step 855. In step 855, the requested data transmitted from the backup/restore application 150 to emulated tape-based media 104, the data being stored on the physical disk-based media 106. The method then continues to step 860.

In step 860, the filemarks and size change events in the state tables which relate to data after the current location of the written data are invalidated. The status that the write command was correct and completed successfully is also indicated by the control layer 310 in step 870 and the value of F_POS in the state tables is updated according to the payload written to the emulated tape-based media 104.

It will again be appreciated that the ordering of some of the above steps may be undertaken in a different order to that detailed above.

Figure 9:
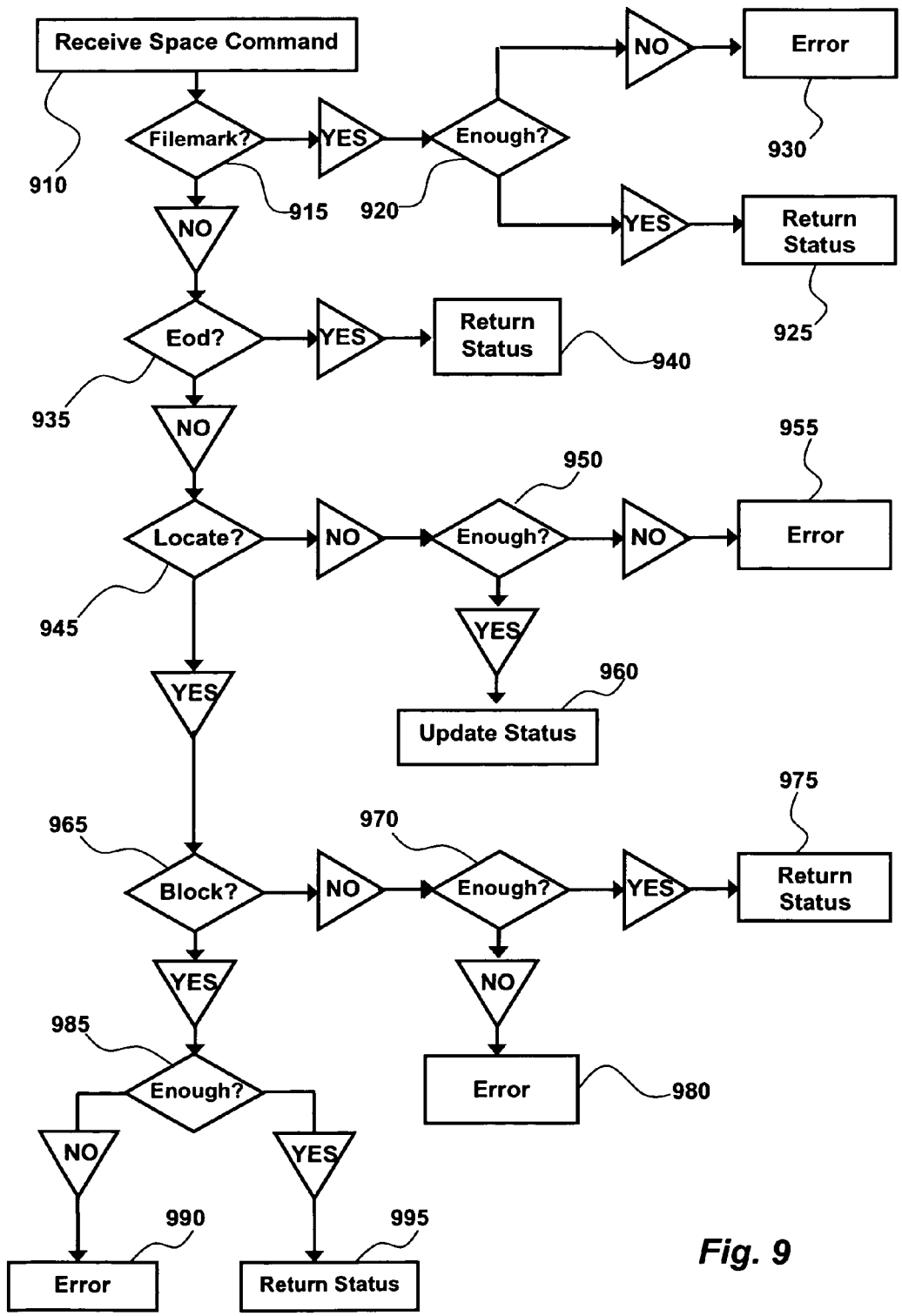
FIG. 9 is a flow diagram of a method of processing a space command for the storage system shown in FIG. 2.

An example embodiment of a method of processing a reposition/space command will now be described with reference to FIG. 9.

In the first step 910, a reposition/space command is received and its corresponding attributes are extracted. Typically, the attributes associated with a space command for tape-based media relate to the type of spacing request, for example spacing in blocks or filemarks, and the spacing amount from the current tape position, such as a number of blocks or filemarks. To enable both forwards and backwards spacing directions, the count may be provided in two's-complement binary form, a positive value indicating a forward spacing direction and a negative value indicating a backwards spacing direction.

In step 915, it is determined whether the reposition/space command is requesting a space to a filemark. If the command is determined to be requesting a space to a filemark, it is then determined, in step 920, whether or not there are enough filemarks in the correct direction. If, in step 920, it is determined that there are enough filemarks in the correct direction, the value of F_POS in the state tables is set to the requested filemark location in step 925. In step 925, the status that the space command was correct and completed successfully is also indicated by the control layer 310. Alternatively, if it is determined that there are not enough filemarks in the correct direction (step 750), the value of F_POS in the state tables is set to the greatest possible value before the EoD or Beginning of Media (BoM) in step 930. Also in step 930, the occurrence of a corresponding spacing error (Space_EoD or Space_BoM) is returned by the control layer 310 and communicated to the backup/restore application 305.

Referring back to step 915, if it is determined that the reposition/space command is not requesting a space to a filemark, it is then determined, in step 935, whether or not the reposition/space command is spacing to the EoD. If, in step 935, it is determined that the reposition/space command is spacing to the EoD, the values of F_POS and BLOCK_NO in the state tables are updated according to the corresponding EoD location in step 940. In step 940, the status that the space command was correct and completed successfully is also indicated by the control layer 310. Otherwise, the method continues to step 945.

In step 945, it is determined whether or not the command is requesting a locate procedure. If the command is determined not to be requesting a locate procedure, it is then determined, in step 950, whether or not there are enough records in the correct direction.

If, in step 950, it is determined that there are enough records in the correct direction, the values of F_POS and BLOCK_NO in the state tables are updated according to the spacing command in step 960. In step 960, the status that the space command was correct and completed successfully is also indicated by the control layer 310. Alternatively, if it is determined that there are not enough records in the correct direction (step 950), the values of F_POS and BLOCK_NO in the state tables are set accordingly with respect to the EoD or BoM in step 955. Also in step 955, the occurrence of a corresponding spacing error (space_EoD or space_BoM) is returned by the control layer 310 and communicated to the backup/restore application 305.

Referring now back to step 945, if it has been determined that the command is requesting a locate procedure, the method proceeds to step 965.

In step 965, it is determined whether the locate procedure is locating to a block. If the command is not determined to be locating to a block, it is then determined, in step 970, whether or not there are enough filemarks on the emulated tape-based media. If, in step 920, it is determined that there are enough filemarks on the emulated tape-based media, the values of F_POS and BLOCK_NO in the state tables are updated accordingly to the locating procedure in step 975. In step 975, the status that the command was correct and completed successfully is also indicated by the control layer 310. Alternatively, if it is determined that there are not enough filemarks on the emulated tape-based media (step 970), the values of F_POS and BLOCK_NO in the state tables are updated to correspond to the EoD in step 980. Also in step 980, the occurrence of a corresponding error (locate_EoD) is returned by the control layer 310 and communicated to the backup/restore application 305.

Referring now back to step 965, if it has been determined that the locate procedure is locating to a block, the method proceed to step 985, wherein it is determined whether there are enough blocks on the emulated tape-based media.

If, in step 985, it is determined that there are not enough blocks on the emulated tape-based media, the occurrence of a corresponding error (locate_EoD) is returned by the control layer 310 and communicated to the backup/restore application 305 in step 990. Alternatively, if it is determined that there are enough blocks on the emulated tape-based media (step 985), the values of F_POS and BLOCK_NO in the state tables are updated accordingly in step 995. Also in step 995, the status that the command was correct and completed successfully is also indicated by the control layer 310.

As before, it will be appreciated that the ordering of some of the above steps may be undertaken in a different order to that as detailed above.

It should be appreciated that alternative embodiments may be implemented in software, hardware or firmware, or any combination thereof. Thus, for example, embodiments may comprise any computer-readable medium with a computer program embodied on it which, when executed, at least in part, on a, performs the functions of the emulated tape-based storage system.

Embodiments therefore embed the tape emulation functionality into an appliance model, where the virtual tape software maps the tape I/Os onto the disk-based storage media and it remains a 'closed' entity. This addresses the problem associated with backed up images that can then be accessed by users relatively easily, allowing for easy (undesirable) deletion and possible byte editing/corruption.

By enabling the use of disk-based storage media to provide what appears to be a tape-based device to hosts, and in a manner that allows the rapid creation of tape devices on as needed basis, there may be provided savings in the cost and time associated with storing data as existing procedures can be used. Multiple virtual tape cartridges can also be stored on one or more disk surfaces.

Embodiments may further allow the tape cartridge size to be set programmatically, rather than the fixed media size procured when buying actual tape device. The tape cartridge size may also expand and contract dynamically with the size of backup jobs.

The replication of tape images is enabled to other servers for the later consumption or creation of data tapes. Thus, embodiments allow for the creation of actual tape media via the reading of the state files and creation of tape that has exactly the same 10 occurrences. This may be achieved either onsite or offsite, according to policy and customer needs.

Examples are also workable with commercial Software Development Kits (SDKs) available for SCSI TCP/IP ToE cards or other host bus adaptors that allow the command protocol to be dealt with using hardware, and the software to provide tape specific emulation functionality. This would allow for faster implementation.

Alternative embodiments may utilize other storage technologies to store less than actual bytes written to the virtual tape media, for example through the leverage of chunking technologies for storing only unique blocks.

The data of table 400 may be stored on the disk-based medium itself, or it may be stored elsewhere. However, this data is associated with a specific disk and is modified in response to data which is read from and written to a specific disk, as is apparent from the above. The data has been described as forming part of "a file system", and this file system can thus be stored on the disk containing the data or elsewhere within the overall system. References to the state tables (of the file system) being updated thus relate essentially to the updating of the data in the table 400.

The input/output operations to underlying physical disk storage can be by means of a singular file containing all the data for a given tape cartridge. All writes are performed by operating system file input/output routines. Specific byte location does not need to be explicitly provided for write and read commands at the emulation level. The reading and writing to the physical storage media is instead controlled by underlying file pointers held by the operating system. It will be understood by those skilled in the art that this is only one possible embodiment presented for clarity, and other representations are possible. For example, raw disk storage can be utilised with no file system. In such a case, more state information may need to be stored by the emulation layer to keep track of utilised disk block locations.

In the example above, the non-tape-based storage medium is disk based. However, other (for example future) memory devices may be equally appropriate, for example other random access memory devices.

The system described above provides an interface between a physical storage medium and an emulated tape-based medium. The physical storage medium is described as "non-tape-based". Thus, the system interfaces between a first type of physical storage medium and a second, different, emulated type of storage medium in the form of an emulated tape-based medium. The "non-tape-based" medium is preferably a random or pseudo-random access storage medium, and most preferably a disk based medium.

Those skilled in the art will realise that the above embodiments are purely by way of example and that modification and alterations are numerous and may be made while retaining the teachings of the invention.

The invention claimed is:

1. A method of accessing data on a non-tape-based storage medium, using tape-based media commands, the method comprising:

receiving tape-based media commands using filemark locations and block numbers;

emulating a tape-based storage medium to have emulated tape-media by interfacing with the non-tape-based storage medium using said tape-based media commands by mapping from the filemark locations and the block numbers to the non-tape-based storage medium;

determining if a received tape-based media command is a read command, a write command or a space command and, if the command is determined to be a space command, processing the space command;

wherein processing a space command comprises:

determining if the space command is requesting a space to a filemark and, if the command is determined to be requesting a space to a filemark, further:

determining if there are enough filemarks on the emulated tape-media in the direction specified by the space command; and if it is determined that there are enough filemarks in the specified direction, setting a value of a filemark position to a value requested by the space command and indicating that the space command was correct and completed successfully or, if it is determined that there are not enough filemarks in the specified direction, setting a filemark position to a greatest possible value before an End of Data or Beginning of Media position and indicating an error.

2. A method as claimed in claim 1, further comprising determining if the space command is spacing to an end of data position and, if it is determined that the space command is spacing to an end of data position, updating values of a filemark position and a block number according to the end of data location, and indicating that the space command was correct and completed successfully.

3. A method as claimed in claim 2, further comprising determining if the space command is requesting a locate procedure and, if it determined that the command is requesting a locate procedure, determining if the locate procedure is locating to a block.

4. A method as claimed in claim 3, wherein if the command is not determined to be locating to a block, the method further comprises determining if there are enough filemarks on the emulated tape-based media and, if there are enough filemarks on the emulated tape-based media, updating values of filemark position and block number according to the locating procedure and indicting that command was correct and completed successfully.

5. A method as claimed in claim 4, wherein if it is determined that there are not enough filemarks on the emulated tape-based media, updating the values of filemark position and block number to correspond to an EoD position and indicating an error.

6. A method as claimed in claim 3, wherein if the locate procedure is locating to a block, the method further comprises determining if there are enough blocks on the emulated tape-based media and, if it is determined that there are not enough blocks on the emulated tape-based media, indicating an error or, if it is determined that there are enough blocks on the emulated tape-based media, updating values of filemark position and block number and indicating that the command was correct and completed successfully.

* * * * *